(12) United States Patent
Lock et al.

(10) Patent No.: US 7,630,817 B2
(45) Date of Patent: Dec. 8, 2009

(54) METHOD FOR CONTROLLING THE SPEED OF A VEHICLE

(75) Inventors: Erwin Lock, Boeblingen (DE);
Christian Muehlbauer, Asperg (DE);
Mario Kustosch, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 416 days.

(21) Appl. No.: 10/519,369

(22) PCT Filed: Feb. 3, 2003

(86) PCT No.: PCT/DE03/00292

§ 371 (c)(1),
(2), (4) Date: Sep. 8, 2005

(87) PCT Pub. No.: WO2004/007230

PCT Pub. Date: Jan. 22, 2004

(65) Prior Publication Data

US 2006/0100768 A1 May 11, 2006

(30) Foreign Application Priority Data

Jul. 11, 2002 (DE) ................................. 102 31 360

(51) Int. Cl.
*B60W 10/18* (2006.01)
(52) U.S. Cl. ...................... 701/93; 701/70; 123/352; 123/332; 60/285
(58) Field of Classification Search .............. 701/93, 701/70, 95; 123/339.11, 322, 325, 332; 60/285; *B60W 10/18, 30/00*
See application file for complete search history.

(56) References Cited

U.S. PATENT DOCUMENTS

| 4,459,668 | A | * | 7/1984 | Inoue et al. ................. 701/20 |
| 4,598,370 | A | * | 7/1986 | Nakajima et al. ............ 701/93 |
| 4,633,831 | A | * | 1/1987 | Ohkumo .................... 123/325 |
| 5,003,483 | A |   | 3/1991 | Hedström |
| 5,646,851 | A | * | 7/1997 | O'Connell et al. ........... 701/93 |
| 6,122,588 | A | * | 9/2000 | Shehan et al. ............... 701/93 |
| 6,138,071 | A | * | 10/2000 | Sekine et al. ............... 701/93 |
| 6,233,515 | B1 | * | 5/2001 | Engelman et al. ........... 701/96 |
| 6,311,117 | B1 | * | 10/2001 | Winner et al. ............... 701/93 |
| 6,405,527 | B2 | * | 6/2002 | Suzuki et al. ................ 60/285 |
| 2001/0013221 | A1 | * | 8/2001 | Suzuki et al. ................ 60/285 |
| 2001/0044689 | A1 | * | 11/2001 | Schmitt et al. .............. 701/93 |
| 2001/0046926 | A1 | * | 11/2001 | Adachi et al. ............... 477/108 |
| 2003/0098010 | A1 | * | 5/2003 | Kustosch ............... 123/339.11 |

FOREIGN PATENT DOCUMENTS

| DE | 22 41 818 | 3/1974 |
| DE | 44 20 116 | 12/1995 |
| DE | 195 37 273 | 4/1997 |
| DE | 196 54 769 | 7/1998 |
| DE | 198 35 937 | 2/2000 |

* cited by examiner

*Primary Examiner*—Tuan C To
(74) *Attorney, Agent, or Firm*—Kenyon & Kenyon LLP

(57) ABSTRACT

A method for controlling the speed of a vehicle, the method making it possible to maintain a predefined setpoint speed even on downhill grades. In the event that the actual speed of the vehicle exceeds the predefined setpoint speed by more than a first predefined speed difference, a service brake of the vehicle will be activated.

4 Claims, 3 Drawing Sheets

METHOD FOR CONTROLLING THE SPEED OF A VEHICLE

BACKGROUND INFORMATION

From German Patent Application No. DE 195 37 273 it is known to trigger wear-free, additional deceleration devices such as retarders with the aid of a speed control. Retarders, and engine brakes as well, may be used to maintain a constant vehicle speed on a downhill grade in those instances where an intervention in the engine control alone may be insufficient to maintain a slow speed. The additional deceleration devices must be differentiated from the service brakes of a vehicle.

SUMMARY OF THE INVENTION

The method according to the present invention for controlling the speed of a motor vehicle has the advantage that a service brake of the vehicle is activated when an actual speed of the vehicle exceeds a predefined setpoint speed by more than a first predefined speed difference. In this way the functionality of the driving speed control may be expanded in such a way that the speed is able to be maintained on downhill road sections, for instance, even in those cases where the drag torque of the vehicle's drive train fails to generate sufficient braking action. The driving speed control may thus be utilized to a greater extent, which increases the driving comfort.

It is particularly advantageous if the service brake is activated only when other measures, such as reducing the torque demand of the driving speed control, an idle speed control, a deceleration fuel cutoff and/or an additional activation of one or a plurality of ancillary components do not lead to sufficient braking action to adequately adjust the actual speed of the vehicle to the predefined setpoint speed. In this way the driving speed control, and thus the service brake, may be realized in a gentle manner prior to activation of the service brake, by utilizing the engine braking action. If the service brake is activated in addition when the engine braking action is active, stronger braking action may be achieved and the driving speed control maintained even in a pronounced downhill gradient, i.e., the actual speed of the vehicle may be sufficiently adjusted to or brought within the range of the predefined setpoint speed in the case of a steep downhill gradient as well.

Another advantage is that the service brake will be deactivated when the actual speed drops below the setpoint speed again. With appropriate selection of the first predefined speed difference, a continual deactivation and activation of the service brake is avoided, which increases the driving comfort.

It is particularly advantageous if the idle speed control is deactivated for as long as the service brake is activated. This saves fuel when the service brake is activated.

Support of the service brake by the engine brake may be obtained by activating the deceleration-fuel cutoff for as long as the service brake remains activate.

Another advantage results if the fuel cutoff on deceleration is activated when the actual speed exceeds the setpoint speed by a fourth predefined speed difference, which is greater than a second predefined speed difference at which the idle-speed control is activated. This activates the fuel cutoff on deceleration only if the braking action achieved by the idle speed control has been insufficient during adjustment of the actual speed of the vehicle to the predefined setpoint speed. This increases the driving comfort, since it avoids an excessive lowering of the torque as it happens in a direct fuel cutoff on deceleration without prior idle speed control.

DETAILED DESCRIPTION

Figure 1:
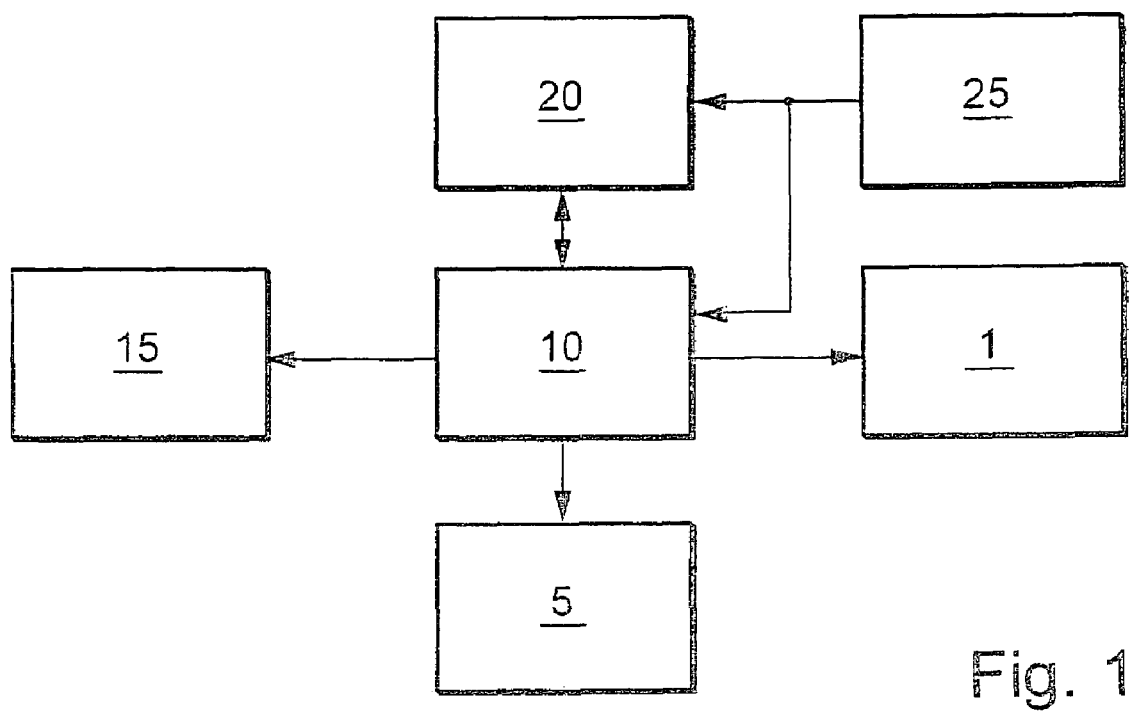
FIG. 1 shows a block diagram with components for realizing the method according to the present invention.

Reference numeral 10 in FIG. 1 denotes a control unit of a motor vehicle, which is connected to a service brake 1 of the motor vehicle—generally a friction brake that is subject to wear—, an idle speed control 5, one or more ancillary components 15, and a driving speed control 20. In addition, a speedometer 25 is provided, which measures the actual speed of the vehicle and is connected to vehicle control 10 and driving speed control 20. Speedometer 25 transmits the actual instantaneous speed of the vehicle to vehicle control 10 and driving speed control 20.

In this exemplary embodiment vehicle control 10 constitutes an expanded engine control, which not only controls the engine of the vehicle but service brake 1 of the vehicle as well.

In the activated state, driving speed control 20 transmits a torque request to vehicle control 10, which vehicle control 10 implements in a manner not shown, by appropriate adjustment of the ignition firing point, the injection duration or the air supply into the combustion chamber of the motor vehicle, for instance.

Figure 2:
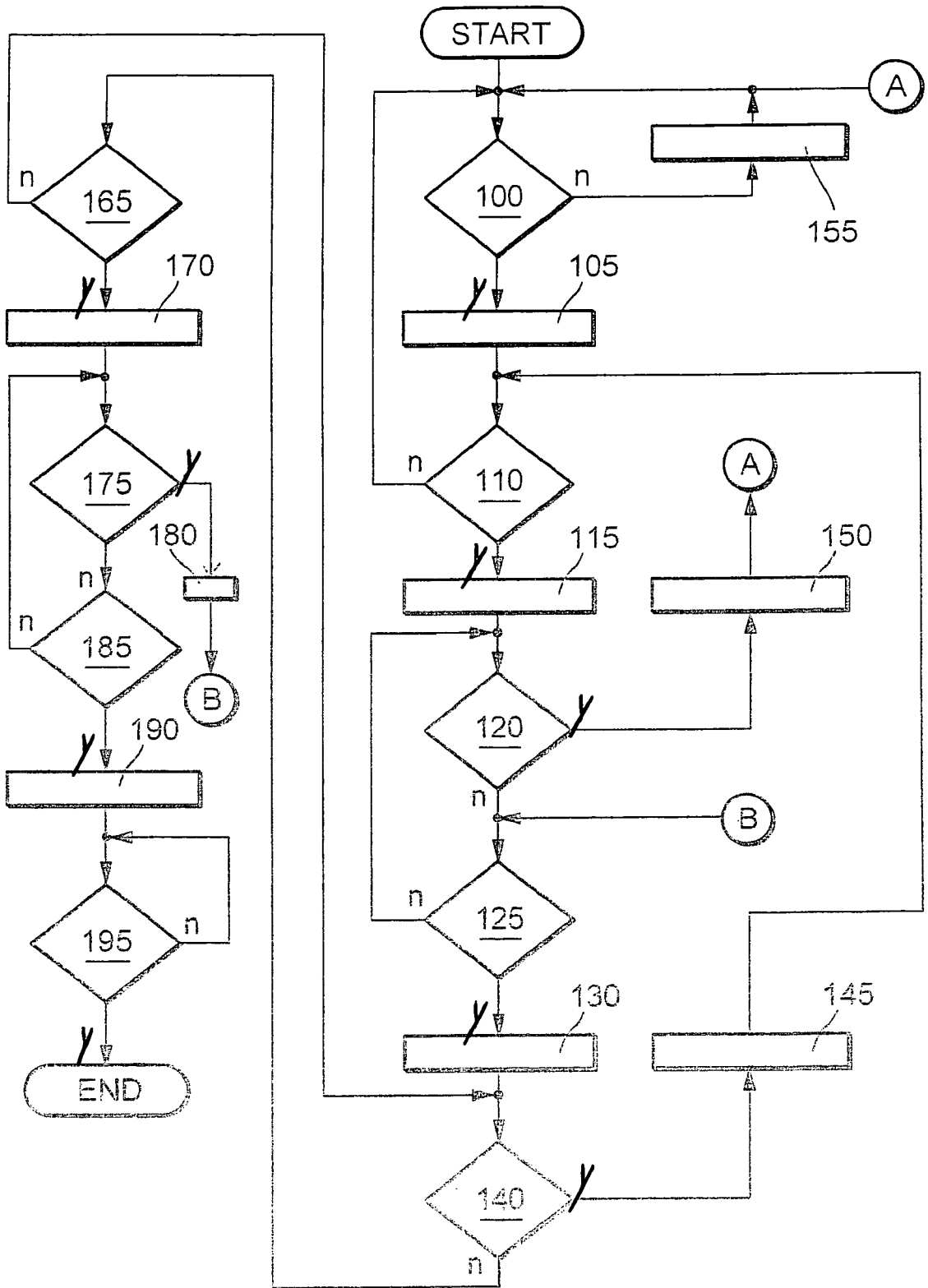
FIG. 2 shows a flow chart for an exemplary sequence of the method according to the present invention.

FIG. 2 describes the method according to the present invention on the basis of a flow chart by way of example. The program is started upon activation of driving speed control 20, for instance by the driver of the vehicle using a cruise control lever. In a program point 100 driving speed control 20 checks whether the actual speed of the vehicle is greater than the predefined setpoint speed. If this is the case, the program branches to program point 105, otherwise the program branches to a program point 155.

In program point 155 the current torque request of driving speed control 20 will be maintained if the actual speed corresponds to the predefined setpoint speed, or it will be raised if the instantaneous speed is lower than the predefined setpoint speed. The method subsequently branches back to program point 100.

In program point 105 driving speed control 20 reduces the torque request to vehicle control 10. The torque request may be reduced by a suitably selected predefined decremental value, for instance, and the increase in the torque request, described in connection with program point 155, may be realized by a likewise suitably selected, predefined incremental value. After program point 105 the program branches to a program point 110.

In program point 110 driving speed control 20 ascertains whether the actual speed exceeds the predefined setpoint speed by more than a second predefined speed difference. If this is the case, the program branches to a program point 115, otherwise the program branches back to program point 100.

In program point 115 an activation signal is set in driving speed control 20 and transmitted to vehicle control 10. Upon receipt of the set activation signal, vehicle control 10 initiates an activation of idle speed control 5 in program point 115, thereby reducing the torque request of the activated ancillary components of the vehicle, such as the air condition system or the generator. The program then branches to a program point 120.

In program point 120 vehicle control 10 checks whether the actual speed exceeds the predefined setpoint speed by less than a third predefined speed difference, which is smaller than the second predefined speed difference. If this is the case, the program branches to a program point 150, otherwise the program branches to a program point 125.

In program point 150 vehicle control 10 initiates a deactivation of idle speed control 5. As soon as driving speed control 20 determines that the actual speed once again exceeds the predefined setpoint speed by less than the third predefined speed difference, it initiates the resetting of the activation signal. After program point 150, the program branches back to program point 100.

In program point 125 vehicle control 10 ascertains whether the actual speed exceeds the predefined setpoint speed by more than a fourth predefined speed difference, which is greater than the second predefined speed difference. If this is the case, the program branches back to a program point 130, otherwise the program branches to program point 120.

In program point 130 vehicle control 10 initiates the activation of a fuel cutoff on deceleration of the vehicle by interrupting the injection of fuel, for instance, and it deactivates idle speed control 5. The program then branches to a program point 140.

In program point 140 vehicle control 10 ascertains whether the actual speed exceeds the predefined setpoint speed by less than a fifth predefined speed difference, which is greater than the second predefined speed difference and smaller than the fourth predefined speed difference. If this is the case, the program branches to a program point 145, otherwise the program branches to a program point 165.

In program point 145 vehicle control 10 initiates a deactivation of the deceleration fuel-cutoff, i.e., in this example, it restores the fuel supply. Vehicle control 10, using an additional suitable activation signal, for instance, subsequently causes driving speed control 20 to resume the program in program point 110.

In program point 165 vehicle control 10 ascertains whether the actual speed exceeds the predefined setpoint speed by more than a sixth predefined speed difference, which is greater than the fourth predefined speed difference. If this is the case, the program branches to a program point 170, otherwise the program branches back to program point 140.

In program point 170 vehicle control 10 initiates the activation of one or more previously non-activated ancillary components, which require additional drag torque in an the activated deceleration fuel-cutoff and thereby generate additional braking action. If no further activatable ancillary components are present in the vehicle and provided the actual speed exceeds the predefined setpoint speed by more than the sixth predefined speed difference, it is branched from program point 165 directly to a program point 185. However, if program point 170 is executed, branching to a program point 175 will take place subsequently.

In program point 175 vehicle control 10 ascertains whether the actual speed exceeds the predefined setpoint speed by less than a seventh predefined speed difference, which is smaller than the sixth predefined speed difference and greater than the fourth predefined speed difference. If this is the case, the program branches to a program point 180, otherwise the program branches to program point 185.

In program point 180 vehicle control 10 initiates a deactivation and thus deenergization of the ancillary component(s) which had additionally been activated or energized in program point 170. The method then branches back to program point 125.

In program point 185 vehicle control 10 ascertains whether the actual speed exceeds the predefined setpoint speed by more than a first predefined speed difference, which is greater than the sixth predefined speed difference. If this is the case, branching to a program point 190 will take place; otherwise, in the event that one or more additional ancillary components had been switched on or activated in program point 170, it is branched back to program point 175. However, if the actual speed does not exceed the predefined setpoint speed by more than the first predefined speed difference, it is branched from program point 185 back to program point 140.

In program point 190, vehicle control 10 initiates an activation of service brake 1 of the vehicle, whereupon the program branches to a program point 195.

In program point 195 vehicle control 10 checks whether the actual speed is lower than the predefined setpoint speed. If this is the case, the program is exited, otherwise the program branches back to program point 195. If the actual speed is less than the predefined setpoint speed, this is also detected by vehicle control 20, which then resets the activation signal it had set.

If driving speed control 20 is still active the described program will be run through again.

Figure 3A:
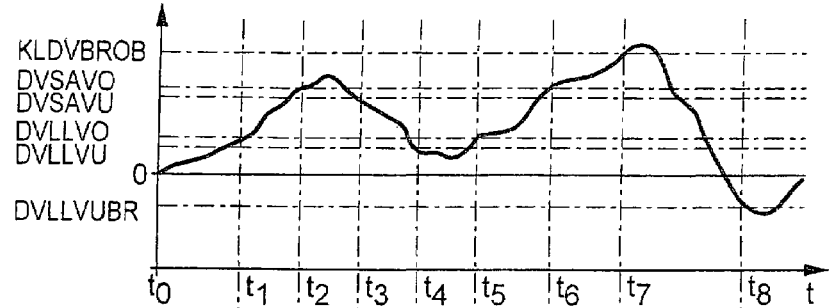
FIG. 3a shows the profile of the actual speed of the vehicle over time.

In FIG. 3a the method according to the present invention is illustrated with the aid of an exemplary profile of the difference between the actual speed of the vehicle and the predefined setpoint speed over time t. The actual speed is denoted by v_act, and the predefined setpoint speed is denoted by v_setpoint, so that the difference plotted over the ordinate is v_act−v_setpoint. For the difference V_act−v_setpoint, the first predefined speed difference is denoted on the ordinate, by KLDVBROB, and amounts to 4 km/h, for example.

The second predefined speed difference is denoted by DVLLVO in FIG. 3a and amounts to 2 km/h by way of example. The third predefined speed difference is denoted by DVLLVU in FIG. 3a and amounts to 1.5 km/h, for instance. The fourth predefined speed difference is denoted by DVSAVO in FIG. 3a and amounts to 3 km/h by way of example. The fifth predefined speed difference is denoted by DVSAVU in FIG. 3a and amounts to 2.5 km/h, for instance. The sixth and seventh predefined speed differences are not shown in FIG. 3a since it is assumed in this example that no additional ancillary components will be activated.

Second predefined speed difference DVLLVO and third predefined speed difference DVLLVU bring about a hysteresis and prevent a continual activation and deactivation of idle speed control 5 when difference v_act−v_setpoint fluctuates by the second predefined speed difference DVLLVO. Correspondingly, fourth predefined speed difference DVSAVO and fifth predefined speed difference DVSAVU cause a hysteresis and prevent a continual switch between deceleration fuel-cutoff and idle speed control when difference v_act−v_setpoint fluctuates by the fourth predefined speed difference DVSAVO.

In addition, the present invention may provide that service brake 1, activated for controlling the driving speed, is deactivated again only when predefined setpoint speed v_setpoint exceeds actual speed v_act by more than a predefined termination value, which is denoted by DVLLVUBR in FIG. 3a. For the flow chart shown in FIG. 2 this means that vehicle control 10 checks at program point 195 whether the predefined setpoint speed exceeds the actual speed by more than the predefined termination value DVLLVUBR. If this is the case, the program is exited, otherwise the program branches back to program point 195. In this manner a hysteresis is also realized for the activation of the service brake to control the driving speed, such hysteresis preventing an excessive switching between the engine brake and the service brake of the vehicle.

Figure 3B:
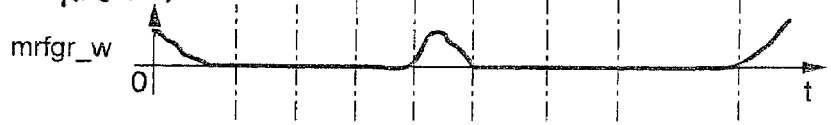
FIG. 3b shows the profile of the torque request of the driving speed control over time.
Figure 3C:
FIG. 3c shows the profile of the idle speed control over time.
Figure 3D:
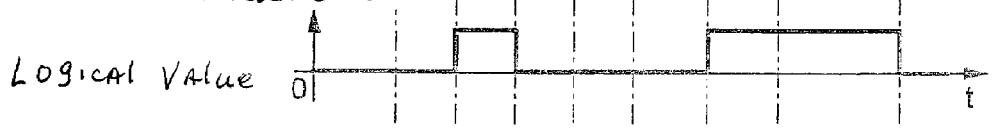
FIG. 3d shows the profile of the fuel cutoff on deceleration over time.
Figure 3E:
FIG. 3e shows the profile of a request to the service brake of the vehicle over time.

In FIG. 3a, difference v_act–v_setpoint increases from instant t=0 up to a first instant $t_1$ and reaches second predefined speed difference DVLLVO at first instant $t_1$. FIG. 3b shows the torque request of the driving speed control over time t, the torque request being denoted by mrfgr_w. The increase in difference v_act–v_setpoint up to first instant $t_1$ results in a reduction of torque request mrfgr_w down to zero even before first instant $t_1$ is reached. FIG. 3c, by means of a logical value, illustrates over time t whether or not idle speed control 5 is activated. In FIG. 3d it is shown over time t with the aid of a logical value whether or not the deceleration fuel-cutoff is activated. FIG. 3e illustrates over time t by means of a logical value whether a brake request for the activation of service brake 1 is present for driving speed control 20.

From instant t=0 to first instant $t_1$ the logical values for the idle speed control, deceleration fuel-cutoff and the brake request are equal to zero, i.e., the idle speed control, the deceleration fuel-cutoff and the service brake are not activated. At instant $t_1$, difference v_act–v_setpoint exceeds the second predefined speed difference DVLLVO. This leads to the activation of the idle speed control whose logical value is set at instant $t_1$. The logical values for the deceleration fuel-cutoff and the brake request remain equal to zero, so that the deceleration fuel-cutoff and the service brake continue to be deactivated. Since torque request mrfgr_w has gone back to zero even before first instant $t_1$ was reached, the torque request of the activated ancillary components is able to be reduced as well by activation of the idle speed control, so that an additional braking action is achieved by the drag torque of the drive unit of the vehicle. Difference v_act–v_setpoint continues to increase from first instant $t_1$ up to a second instant $t_2$, and at second instant $t_2$ exceeds fourth predefined speed difference DVSAVO. At second instant $t_2$ the logical value for the deceleration fuel-cutoff is therefore set and the deceleration fuel-cutoff activated, whereas the idle speed control is deactivated at second instant $t_2$ and the logical value for the idle speed control is reset. The logical value for the brake request continues to remain equal to zero, so that service brake 1 stays deactivated. Due to the deceleration fuel-cutoff, the engine braking initiated by idle speed control 5 is amplified in its effect as a result of the fuel supply being switched off. Any torque requests of the activated ancillary components are reduced to zero in the process. Since idle speed control 5 is activated between first instant $t_1$ and second instant $t_2$, the transition to the point where the torque requests of the activated ancillary components are reduced to zero will not occur abruptly, so that the driving comfort is not overly affected.

First instant $t_1$ follows instant t=0. Second instant $t_2$ follows first instant $t_1$.

Between second instant $t_2$ and a subsequent third instant $t_3$, difference v_act–v_setpoint reaches a maximum value, which is smaller than first predefined speed difference KLD-VBROB, however, so that service brake 1 will not be activated. Due to the braking action achieved by the activated deceleration fuel-cutoff, difference v_act–v_setpoint then drops again, and at third instant $t_3$ falls below fifth predefined speed difference DVSAVU. At third instant $t_3$, the deceleration fuel-cutoff is therefore deactivated again and the logical value for the deceleration fuel-cutoff set back, whereas the idle speed control is reactivated again at third instant $t_3$ and its logical value is set.

It is also possible, of course, that a lower gradient of the road stretch was a contributing factor in the reduction of difference v_act–v_setpoint as well. At fourth instant $T_4$ following third instant $t_3$, difference v_act–v_setpoint then drops below third predefined speed difference DVLLVU, so that the idle speed control will be deactivated again at fourth instant $t_4$ as well and its logical value set back to zero. Between fourth instant $T_4$ and a subsequent fifth instant $t_5$, difference v_act–v_setpoint reaches a minimum that is greater than zero and smaller than third predefined speed difference DVLLVU. Between fourth instant $t_4$ and fifth instant $t_5$, driving speed control 20 is therefore able again to be realized by a torque request mrfgr_w≧0. Between fourth instant $t_4$ and fifth instant $t_5$, idle speed control, deceleration fuel-cutoff and service brake 1 are deactivated. Difference v_act–v_setpoint increases again up to fifth instant $t_5$, so that torque request mrfgr_w of driving speed control 20 is reduced once more. At fifth instant $t_5$, difference v_act–v_setpoint exceeds second predefined speed difference DVLLVO, so that torque request mrfgr_w has returned to zero at fifth instant $t_5$, and idle speed control 5 is reactivated by setting the logical value.

Starting with fifth instant $t_5$, difference v_act–v_setpoint rises once more and at a sixth instant $t_6$, which follows fifth instant $t_5$, exceeds fourth predefined speed difference DVSAVO again. As a result, idle speed control 5 is reactivated at sixth instant $t_6$ by having its logical value reset to zero, and the deceleration fuel-cutoff is reactivated by setting of its logical value. Service brake 1 remains deactivated. Starting with sixth instant $t_6$, difference v_act–v_setpoint continues to increase and exceeds first predefined speed difference KLD-VBROB at seventh instant $t_7$, which follows sixth instant $t_6$. At seventh instant $t_7$, service brake 1 will therefore be activated, the logical value of the brake request being set at seventh instant $t_7$. The deceleration fuel-cutoff remains activated as before, so that service brake 1 is aided by the engine brake realized by the deceleration fuel-cutoff. Shortly after seventh instant $t_7$, difference v_act–v_setpoint reaches a maximum above first predefined speed difference KLD-VBROB and then drops in a relatively steep manner due to the braking action and possibly as a result of a downhill slope whose gradient is decreasing again. At an eighth instant $t_8$ which follows seventh instant $t_7$, difference v_act–v_setpoint then drops below the predefined switch-off instant DVLLVUBR, so that service brake 1 is deactivated at eighth instant $t_8$, the logical value of the brake request is set back to zero, the deceleration fuel-cutoff is deactivated as well and the logical value reset to zero, the idle speed control deactivated, the logical value remaining set back. Starting with eighth instant $t_8$, driving speed control 20 may then be implemented again with the aid of torque request mrfgr_w, which begins to rise again beginning with eighth instant $t_8$.

The profile of difference v_act–v_setpoint in FIG. 3a has been selected as an example and may result from a road section that has downhill gradients of different magnitudes; between instant t=0 and fourth instant $t_4$, a low gradient is present, and between fifth instant $t_5$ and eighth instant $t_8$ a more pronounced gradient occurs, which also results in a greater difference v_act–v_setpoint.

Furthermore, in the example in FIGS. 3a-3e it can be seen that the deceleration fuel-cutoff is activated as well when service brake 1 is activated, but not idle speed control 5.

According to the described exemplary embodiment, the driving speed control has a stepped profile. As difference v_act–v_setpoint of the driving speed increases, the initial response is a reduction of the torque request of driving speed control 20, followed in a second step by activation of idle speed control 5, and thus a reduction of the torque request of activated ancillary components, followed in a third step by deceleration fuel-cutoff and thus an interruption of the fuel injection in this example and, finally, in a fourth step, an activation of the service brake. It need not necessarily be the case that all mentioned steps are initiated as a function of the maximally achieved difference v_act–v_setpoint; this will depend on the predefined speed differences that are exceeded by the difference v_act–v_setpoint. The exemplary embodiment shown in FIGS. 3a-3e does not include the step according to FIG. 2 in which additional ancillary components are switched in when the sixth predefined speed difference is exceeded. Important for the present invention is the activation of the service brake when difference v_act–v_setpoint of the driving speed exceeds the first predefined speed difference. The additional steps of activation of the deceleration fuel-cutoff, activation of the idle speed control and/or activation of one or a plurality of further ancillary components may be provided optionally and in addition, in any desired combination. If the steps of deceleration fuel-cutoff and idle speed control are both provided, it is possible—as described in FIGS. 3a-3e—to deactivate the idle speed control when deceleration fuel-cutoff is activated.

The step according to FIG. 3b in which the torque request is modified constitutes the usual driving speed control, which according to the present invention is aided by the service brake and possibly the engine brake in those instances only where the difference v_act–v_setpoint of the driving speed exceeds the corresponding predefined speed differences and a pure adaptation of the torque request is no longer sufficient to control the driving speed.

If service brake 1 is activated, difference v_act–v_setpoint in the specific embodiment according to FIGS. 3a-3e is reduced in that the normal closed-loop control of vehicle control 20 is resumed by varying the torque request according to FIG. 3b only when the service brake has been deactivated again at eighth instant $t_8$ on account of difference v_act–v_setpoint dropping below predefined switch-off point DVLLVUBR. Only following eighth instant $t_8$ will an engine torque then be requested again by vehicle control 20. Due to the fact that according to FIG. 3e and FIG. 3d deceleration fuel-cutoff is activated as well between seventh instant $t_7$ and eighth instant $t_8$ when service brake 1 is activated, and, according to FIG. 3c, idle speed control 5 is deactivated when deceleration fuel-cutoff is activated, both the hysteresis of the idle speed control and the hysteresis of deceleration fuel-cutoff are deactivated in the exemplary embodiment of FIGS. 3a-3e given an activated service brake 1. The exemplary embodiment of FIGS. 3a-3e implements the flow chart according to FIG. 2, with the sole exception that—as described—in the exemplary embodiment according to FIGS. 3a-3e the step of switching in one or a plurality of additional ancillary components when difference v_act–v_setpoint of the vehicle speed exceeds the sixth predefined speed difference is not realized.

The predefined speed differences may be suitably selected or applied in such a way, for instance, that the idle speed control sets in only when the torque request of driving speed control 20 has already been reduced down to zero, and the deceleration fuel-cutoff only sets in when all torque requests of activated ancillary components have already been reduced to zero with the aid of idle speed control 5. The first predefined speed difference may be specified such that, for instance, the activation of service brake 1 occurs only when the engine braking action realized by the deceleration fuel-cutoff and possibly further activation of one or a plurality of ancillary components has already reached a maximum value.

What is claimed is:

1. A method for controlling a speed of a vehicle, comprising:
   when an actual speed of the vehicle exceeds a predefined setpoint speed by more than a first predefined speed difference, activating a service brake of the vehicle, wherein the first predefined speed difference has a value greater than zero; and
   wherein in the case of the actual speed of the vehicle exceeding the predefined setpoint speed, preventing activation of the service brake if the actual speed of the vehicle exceeds the predefined setpoint speed by less than the first predefined speed difference, and wherein the first predefined speed difference is specified such that the activation of the service brake occurs only when the engine braking action realized by a deceleration fuel-cutoff has already reached a maximum value.

2. The method according to claim 1, further comprising deactivating the service brake when the actual speed drops below the setpoint speed again.

3. The method according to claim 1, further comprising, when the actual speed exceeds the setpoint speed, reducing first a torque request of a driving speed control.

4. The method according to claim 1, wherein the first predefined speed difference is specified such that the activation of the service brake occurs only when the engine braking action realized by said deceleration fuel-cut-off and further activation of at least one ancillary component has already reached a maximum value.

* * * * *

UNITED STATES PATENT AND TRADEMARK OFFICE
CERTIFICATE OF CORRECTION

PATENT NO. : 7,630,817 B2  Page 1 of 1
APPLICATION NO. : 10/519369
DATED : December 8, 2009
INVENTOR(S) : Lock et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 406 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,630,817 B2 | Page 1 of 1 |
| APPLICATION NO. | : 10/519369 | |
| DATED | : December 8, 2009 | |
| INVENTOR(S) | : Lock et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 405 days.

Signed and Sealed this

Eleventh Day of January, 2011

David J. Kappos
*Director of the United States Patent and Trademark Office*